J. R. & A. J. Cross,
Apparatus for Graining Pails,
No. 2,637, Reissued June 4, 1867.
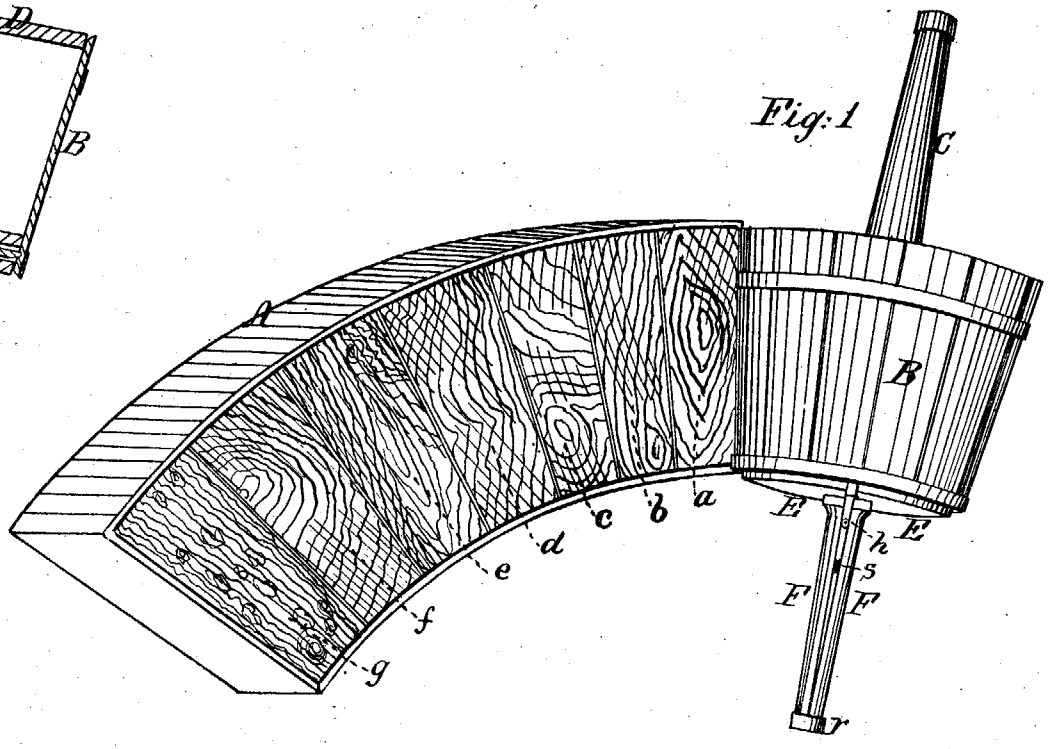
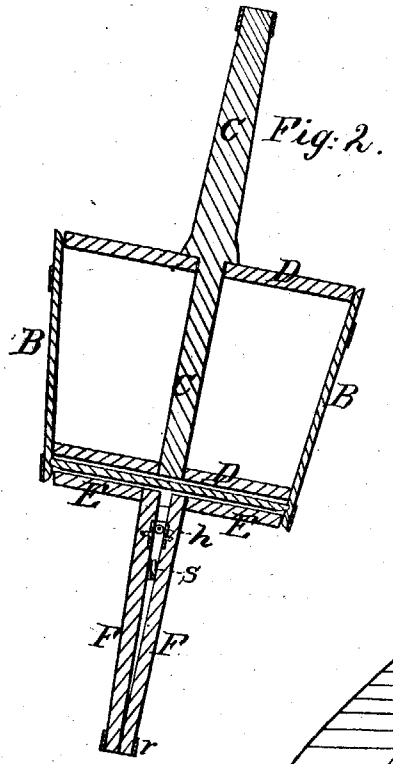
Witnesses
L. L. Coburn
W. E. Mann
Inventor
J. R. Cross
A. J. Cross

UNITED STATES PATENT OFFICE.

JOHN R. CROSS AND ALFRED J. CROSS, OF CHICAGO, ILLINOIS.

APPARATUS FOR GRAINING PAILS.

Specification forming part of Letters Patent No. 45,590, dated December 27, 1864; Reissue No. 2,637, dated June 4, 1867.

*To all whom it may concern:*

Be it known that we, JOHN R. CROSS and ALFRED J. CROSS, of Chicago, in the county of Cook and State of Illinois, have invented a new and useful Improvement in Machine for Graining Pails and other similar ware; and we do hereby declare and make known that the following is a full, clear, and exact description of the same, reference being had to the accompanying drawings, and the letters and figures marked thereon, which form part of this specification.

The nature of our invention consists in constructing an elastic bed containing impressions of the designs to be painted or grained upon the pail or other similar vessel in separate sections or panels, each panel to be of a distinct design, so as to represent upon the pail or other vessel the staves thereof in said diverse and distinct designs as formed upon the said elastic bed or form. The bed containing the impressions to be grained upon the pail may be fixed so that the impression is produced upon the pail by rolling it over and upon said bed; or the form containing the elastic bed may be provided with suitable handles or supports, and be moved around upon the surface of the pail, as preferred.

To enable those skilled in the art to understand how to construct and use our invention, we will proceed to describe the same with particularity, making reference in so doing to the aforesaid drawings, in which—

Figure 1 represents a perspective view of one form of our invention, and Fig. 2 is a central sectional view of a pail with devices attached for operating the same.

Similar letters of reference in the different figures denote the same parts.

A represents a box or bed, in which is placed the elastic material impressed with the desired designs to be represented upon the pails, and it may be constructed of wood, iron, or any other suitable material. The said elastic bed upon which the desired impressions are made presents a surface whose area is included between the arcs of two concentric circles, described upon radii whose difference in length is equal to the height of the pail or other vessel to be grained, the length of the exterior arc being equal to the circumference of the top or larger end of the pail, and the length of the interior arc being equal to the circumference of the bottom or smaller end thereof, and the corresponding ends of the two arcs being joined by straight lines. The curvatures of said arcs must obviously be varied, and adapted to the different sizes of the pails or vessels to be grained, and also to the different inclinations of their sides from the vertical, if there be any, so that, when the pail is adjusted properly upon the bed and one is rolled or moved over the other, the two ends of the pail shall correspond with the ends of the bed with exactness and precision. The bed could be used, however, to grain vessels of a less height than the distance between the two arcs, provided the inclination of the sides of the vessel be of the same degree. It may be observed, also, that where the vessels to be grained have upright sides the elastic bed may be of a rectangular form. The said elastic bed may be composed of any suitable impressible material, as leather or rubber; but we consider the best material for the purpose to be a compound of glue and molasses ordinarily used for printers' rollers. This bed may be constructed of separate blocks, as shown, (marked *a b c d e f g* in Fig. 1;) or said material may be a single united mass, impressed with various designs arranged in staves, so as to effect the same results as when arranged in separate blocks, the pail or vessel being grained thereby presenting the appearance of being composed of staves of different woods or woods of different qualities. The same arrangement of the material may be used to imitate marbles and other ornamental stones, for japanning, and for graining broom-handles.

By constructing the form containing the elastic impressible material with joints on the lines between the various panels aforesaid, or by constructing said form of some material susceptible of being bent, the said form may, by bringing the ends together, be so arranged as to present the elastic paneled bed in a convex form. We do not, however, consider the form of the said paneled bed essential, as any convenient form may be used, providing the same be adapted for the purposes described, the essential feature of our invention consisting in arranging the said elastic bed in appropriate panels or staves, substantially as described.

Although forming no part of the invention which we design to claim, yet, as illustrating the manner of using our invention by rolling the pail over the elastic bed, we will now describe a device for holding the pail during the operation.

D D are two circular plates, fitting closely into the pail, as shown, which are rigidly attached to the handle C, and when introduced firmly secure the pail to said handle C. E E represent a circular plate, divided into two parts, to each of which is secured one of the arms F F, forming a handle to the said plate E E, said arms F F being connected by a hinge at *h*, and between them is arranged a spring, *s*, to throw the handles F F apart when not confined by a ring, *r*. When the ring *r* is removed the spring *s* operates to bring the parts of the disk E together, so they can readily be inserted within the chine of the bottom of the pail, when, by pressing the arms F F together, the plate E expands and firmly holds the pail to the handles F F, so that the operator, by grasping the handles C and F, can readily roll the pail over the bed, as desired, said bed having been previously prepared with paints or coloring matter in any suitable manner. Instead of rolling the pails over the bed, the pails may be suspended upon handles, or their removable equivalent, and the elastic bed be moved in contact therewith, producing the same result; or the application may be made in any other convenient and practical manner.

Having described the nature, construction, and operation of our invention, we will now specify what we claim and desire to secure by Letters Patent.

1. We claim an elastic bed of any suitable material, whether curved or rectangular in form, when arranged in a series of distinct staves or designs, substantially as and for the purposes specified.

2. We claim constructing the said bed of elastic material in the curved form shown, to be applied as described, whether said bed be arranged in a series of distinct designs or in one general design, for the purposes set forth.

JOHN R. CROSS.
ALFRED J. CROSS.

Witnesses:
W. E. MARRS,
L. L. COBURN.